United States Patent [19]

Wheen

[11] Patent Number: 4,729,123

[45] Date of Patent: Mar. 1, 1988

[54] METHOD FOR ESTABLISHING AND MAINTAINING SYNCHRONIZATION BETWEEN COMMUNICATING MULTIPLEXERS USING CHECKSUM VALUES

[75] Inventor: Andrew J. T. Wheen, Finchampstead, England

[73] Assignee: General Datacomm, Inc., Middlebury, Conn.

[21] Appl. No.: 896,259

[22] Filed: Aug. 14, 1986

[51] Int. Cl.$^4$ ............................................... H04J 3/06
[52] U.S. Cl. ...................................... 370/100; 375/114
[58] Field of Search ...................... 370/60, 100, 110.1, 370/114; 375/104; 364/900

[56] References Cited

U.S. PATENT DOCUMENTS

| | | | |
|---|---|---|---|
| 4,543,654 | 9/1985 | Jones | 370/60 |
| 4,577,333 | 5/1986 | Lewis et al. | 375/104 |
| 4,587,652 | 5/1986 | Goldman | 370/110.1 |
| 4,641,274 | 2/1987 | Swank | 364/900 |

Primary Examiner—Salvatore Cangialosi
Attorney, Agent, or Firm—David P. Gordon

[57] ABSTRACT

Methods for establishing and maintaining synchronization between communicating multiplexers are provided, wherein a first multiplexer having a frame format multiplexes at least data according to the frame format, and wherein the second multiplexer demultiplexes at least said data according to the frame format, and synchronization is established by: providing the frame format with bit positions for a plurality of bits including first predetermined bit positions for a plurality of checksum bits, and second predetermined bit positions for bits other than checksum bits; calculating a checksum for the bit values of bits located at said second predetermined bit positions, and inserting bits representing the said calculated checksum into said first predetermined bit positions; sending bits including bits located at said first and second predetermined bit positions in said frame format from said first multiplexer to said second multiplexer; and establishing synchronization between said first and second multiplexers by using said bits representing said calculated checksum.

In establishing synchronization, the second multiplexer chooses an arbitrary bit as the first bit in the frame. Received bits located at distances from the first bit which are equivalent to the second predetermined bit positions are then used to calculate a checksum. Bits are then located at distances from the first bit which are equivalent to the predetermined first positions. If the checksum calculations do not correspond to the found checksum bits, frame synchronization is not established. The process is then repeated starting with the next bit after the arbitrary point, and continued until the calculated checksum agrees with the bits at the checksum locations.

20 Claims, 2 Drawing Figures

METHOD FOR ESTABLISHING AND MAINTAINING SYNCHRONIZATION BETWEEN COMMUNICATING MULTIPLEXERS USING CHECKSUM VALUES

BACKGROUND

This invention relates to time division multiplexers and more particularly to methods for synchronizing such multiplexers.

Multiplexers are devices which permit information to be transmitted from a plurality of information sending devices to a plurality of information receiving devices over a single aggregate line. Communicating multiplexers typically transmit frames of data and control information from a plurality of channels as well as intermultiplexer overhead information according to a frame format. A frame is a fixed number of sequentially transmitted bits. A frame format is the order in which the bits (which are typically received from a plurality of sources) are arranged for transmission. The meaning or significance of each bit may therefore be determined from its position within the frame format. Thus, the transmitting multiplexer places the data and control information from each channel into the allocated bit positions according to the frame format. Intermuliplexer overhead information is likewise added to the frame and the frame is serially transmitted to the receiving multiplexer. Because the information is transmitted in a particular order according to the frame format, the receiving multiplexer can determine whether the received information is to be sent to a particular channel or whether it is to be used internally. The information to be used internally is the intermultiplexer overhead information and includes intermultiplexer communications information and intermultiplexer synchronization information. The intermultiplexer synchronization information permits the multiplexers to work in synchronization such that the data, control, and other information which was combined into a single bit stream according to the frame format of the sending multiplexer, is properly decoded by the receiving multiplexer so that it is properly sent to its destination.

A conventional technique for achieving synchronization between multiplexers is to transmit a synchronization word at the start of each frame. A synchronization word consists of a fixed number of bits that have been set to known values. The synchronization bits are sent by a first multiplexer at the start of the frame, and at a second or receiving multiplexer (demultiplexer), the incoming bits are scanned until the synchronization word is found. Since it is possible for data bits to assume the same values as the bits in the synchronization word, the corresponding bits in several successive frames must hold a valid synchronization word before the receiving multiplexer can safely assume that frame synchronization has been achieved.

While the conventional synchronization technique typically performs its function properly, in certain circumstances, such as where a channel is continuously transmitting tones at particular amplitudes and frequencies, the synchronization word can be imitated by data bits of several frames. Thus, the receiving multiplexer could find synchronization at the wrong point. Another problem with the conventional technique is that the synchronization bits must be included in the frame because they are required to first establish synchronization. As a result, the synchronization bits cannot be used to convey any information other than the frame format position. However, once synchronization has been achieved, the synchronization bits are almost always redundant. This redundancy thereby decreases the possible data throughput of the system.

SUMMARY OF THE INVENTION

It is therefore an object of the invention to provide a method for the synchronization of multiplexers which utilizes previously allocated bits of a frame in a second capacity as synchronization bits.

It is a further object of the invention to provide a method for the synchronization of multiplexers which eliminates a false determination of synchronization by continually changing the synchronization word.

Yet another object of the invention is to provide a method for the synchronization of multiplexers which uses a checksum of other transmitted bits as the synchronization word.

The method of the invention for providing synchronization between first and second communicating multiplexers, wherein said first multiplexer having a frame format multiplexes at least data according to the frame format, and sends the data over an aggregate channel to said second multiplexer, and wherein the second multiplexer demultiplexes at least said data received from said aggregate channel according to said frame format, broadly comprises:

(a) providing said frame format with the bit positions for plurality of bits including first predetermined bit positions for a plurality of checksum bits, and second predetermined bit positions for bits other than checksum bits;

(b) calculating a checksum for the bit values of bits located at said second predetermined bit positions, and inserting bits representing the said calculated checksum into said first predetermined bit positions;

(c) sending bits including bits located at said second predetermined bit positions in said frame format and bits representing the calculated checksum and located at said first predetermined bit positions in said frame format from said first multiplexer to said second multiplexer; and (d) establishing synchronization between said first and second multiplexers by using said bits representing the calculated checksum.

In establishing synchronization, the second (receiving) multiplexer chooses an arbitrary bit received from the first multiplexer as the first bit in the frame. Received bits located at distances from the first bit (as arbitrarily defined) which are equivalent to the predetermined second positions are then used to calculate a checksum. Bits located at distances from the first bit which are equivalent to the predetermined first positions (checksum positions) are then located. If the calculations on the located bits do not correspond to the found checksum bits, it is assumed that the arbitrary position selected is not the beginning of the frame. The process is then repeated starting with the next bit after the arbitrary point. This procedure is continued until the calculated checksum agrees with the bits at the checksum positions. When this occurs, the corresponding bits in a plurality of following frames are tested. If the calculated checksum equals the checksum value of the transmitted bits for a predetermined amount of times, synchronization is determined to be found. Synchronization is maintained by continually calculating the checksum of the particular data bits and comparing the calculated checksum to the transmitted checksum. The comparison value is fed to an up-down counter which outputs an out-of-sync signal if its value drops below a predetermined threshold.

Further objects and advantages of the invention will be more readily understood by those skilled in the art upon reference to the detailed description of the invention taken in conjunction with the figures.

DETAILED DESCRIPTION OF THE PREFERRED EMBODIMENT

Figure 1:
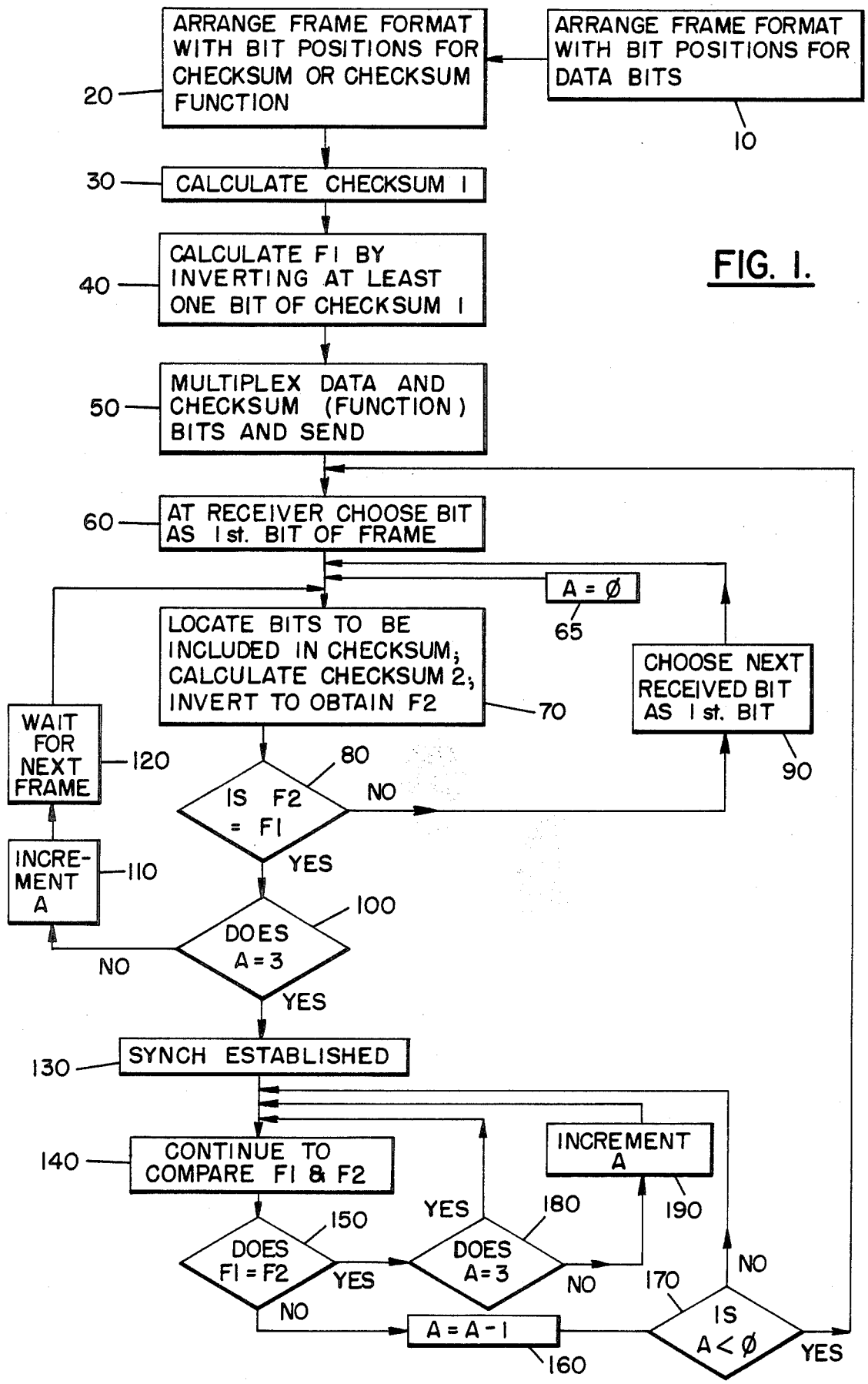
FIG. 1 is a flow chart of the multiplexer synchronization method of the invention.

As indicated above, conventional multiplexers multiplex information from a plurality of sources into a single bit stream. The bit stream includes channel data and control information as well as intermultiplexer synchronization and communications information. The information is typically multiplexed according to a repeating frame format of the multiplexer which receives information from contributors and places the received information into an assigned order for sending over an aggregate channel ("aggregate" or "aggregate channel" being used herein in the broad sense to include any means including lines, satellites, etc. which carry or transmit the multiplexed information.) In this manner, a multiplexer which is receiving the bit stream over an aggregate may demultiplex the information according to the frame format. The receiving multiplexer then sends the channel data and control information to the proper channels and uses the intermultiplexer information to establish and maintain synchronization as well as for intermultiplexer communication purposes. Synchronization between the sending and receiving multiplexers is critical because if the multiplexers are not synchronized, the information will be sent to the wrong channels. Thus, in conventional multiplexer frames, a plurality of bits are alloted solely for intermultiplexer synchronization. As will be described hereinafter, this requirement is eliminated by the frame synchronization method of the invention which uses checksum bits for synchronization. It should be appreciated that the word "checksum" as used herein is defined to mean one or more redundant bits of information that are added before transmission to other bits of information to enable a receiver to detect errors introduced into the other bits of information during transmission.

Particularly for low bit rate speech coding, and as will be described hereinafter with reference to FIG. 2, among the information being transmitted according to the frame format are root mean square (RMS) values for frequency groupings, as well as a checksum which is used to detect changes in the RMS values caused by transmission errors. Typically, the number of bits used for the checksum is equal to the number of bits found in each of the RMS values. One preferred checksum is simply equal to a repetitive exclusive OR operation (XOR) of the RMS values. Thus, if five RMS values are to be transmitted (RMS1, RMS2, RMS3, RMS4, RMS5), the checksum CH would be calculated as:

$$CH = ((((RMS1.XOR.RMS2).XOR.RMS3).XOR.RMS4).XOR.RMS5) \quad (1)$$

It will be appreciated that a checksum for a different amount of RMS values could similarly be calculated. If desired, a function of the checksum can be transmitted rather than the checksum CH of equation (1). Thus, an XOR of the checksum CH and a value such as 0110 (for a four bit checksum) might be used: i.e.

$$F1 = CH.XOR.0110 \quad (2)$$

Those skilled in the art will appreciate that such a function is also considered a checksum of the bits in the predetermined locations, as for purposes herein, the term "checksum" was defined broadly to include redundant bits which facilitate transmission error detection. Those skilled in the art will also appreciate that a scheme which provides a checksum which is a function of a checksum calculated directly from the bits would alleviate problems which could occur if synchronization took place while the channel was idle. In such a situation, a preponderance of zeros in the incoming data would appear, and the XOR checksum would equal zero. Thus, as will be discussed hereinafter, synchronization could be improperly indicated. However, an inversion of the two middle bits (or any bit for that matter) would eliminate such a problem.

In accord with the invention, in order to establish synchronization without using especially assigned intermultiplexer synchronization bits, bit positions for data bits and checksum bits must be assigned in the frame format for transmission over the aggregate. Thus, at 10 and 20, the frame format of the multiplexer is arranged to include (second) predetermined positions for a plurality of data bits, and (first) predetermined positions for the checksum of the bit values for at least the bits located in the second predetermined positions. In schemes for the transmission of low bit rate speech code, the predetermined "data" bits would preferably be the RMS values of frequency groupings. However, those skilled in the art will appreciate that other data bits may be used provided the positions of those bits are predetermined for a particular frame format such that a checksum of the bit values may be obtained by both the transmitting and receiving multiplexers. Regardless, at 30, a checksum (checksum 1) for the bits which were located at the second predetermined locations in the frame format is calculated, preferably according to an operation such as suggested in equation (1) above. At 40, an operation for inverting at least one of the bits of the checksum calculated at 30 is preferably performed according to suggested equation (2) above, and after the bits representing the checksum are inserted into the frame, the data bits and the checksum (checksum function value (F1)) are transmitted at 50 to a receiving multiplexer according to the transmit frame format.

For initially establishing synchronization upon receiving the multiplexed information, the receiving multiplexer selects an arbitrary bit of information, defines the selected bit as the first bit of the frame at 60, and performs calculations in accord therewith. Thus, at 70, a checksum (checksum 2) is calculated for the bits located at positions or locations relative to the first bit which are equivalent to the second predetermined locations (i.e. if bits in bit locations two, twelve, twenty-two, thirty-two, forty-two and fifty-two in a frame are used to generate a bit of a checksum, the first, eleventh, twenty-first, thirty-first . . . bits received after the first bit are located). The inverting function is applied to the calculated checksum to provide a checksum function value (F2). At 80, the checksum function value ("checksum" in the broad sense) calculated at 70 is compared to the bits in positions equivalent to the first predetermined bit locations (i.e., if the checksum function bits are assigned to bit positions sixty through sixty-three of the transmit frame, the fifty-ninth through sixty-second bits received after the assigned "first bit" are used for comparison). If the bits of data in the expected checksum locations do not correspond to the calculated checksum function bits, it is assumed that the arbitrary bit selected as the first bit of the frame is not in fact the first bit of the frame. Thus, at 90, the next bit after the previously selected "first bit" is denoted as the first bit, and the calculation and comparison at 70 and 80 is repeated. This procedure is continued until the calculated checksum function F2 (checksum) agrees with the bits (F1) located in the checksum (function) bit positions in the received data frame format.

When the checksum functions are equal, synchronization is not yet assumed. Thus, a comparison as made at 100 to see whether a counter which was set to zero at 65 has reached a predetermined value such as three (i.e. four successive positive comparisons). If the counter is not yet at the value, the counter is incremented at 110. By waiting at 120 for the next frame of information to arrive, the identical locations identified at 70 can be used to see whether the bits correspond to the new checksum function being transmitted. If the checksum values agree at 80, a counter comparison is made at 100 again until the predetermined value has been reached. However, if the checksum values are not equal, it is assumed that the previous agreement in values was coincidental, and the entire procedure resumes at 90 by choosing the next bit as the first bit of the frame.

Once the counter reaches its predetermined value at 100, synchronization is determined to be found at 130. Synchronization is carefully maintained by continually calculating the checksum of the particular data bits at 140 and comparing the calculated checksum to the transmitted checksum at 150. The comparison value is then fed to an up-down counter which outputs an out-of-sync signal if its value drops below a predetermined threshold. Thus, if the checksum values do not agree once synchronization has been established, the counter is decremented at 160 and compared to a predetermined threshold (such as −1) at 170. If continued failures had caused the counter to reach the predetermined threshold, a determination is made that synchronization has been lost. In response, the entire procedure for establishing synchronization is restarted at 60. However, if the counter has not been decremented down to the predetermined threshold, it is assumed that a bit value has been corrupted, and synchronization is again monitored at 140 and 150. If the checksum values then agree at 150, a determination is made at 180 as to whether the counter is at its predetermined maximum value (e.g. three). If it is, checksum comparison continues at 140 and 150. If the counter value has been decremented below its maximum value, but now the function values agree, the counter is incremented at 190 and the checksum function comparison continues at 140 and 150. In the manner, the checksum functions bits establish and maintain synchronization between the multiplexers.

Figure 2:
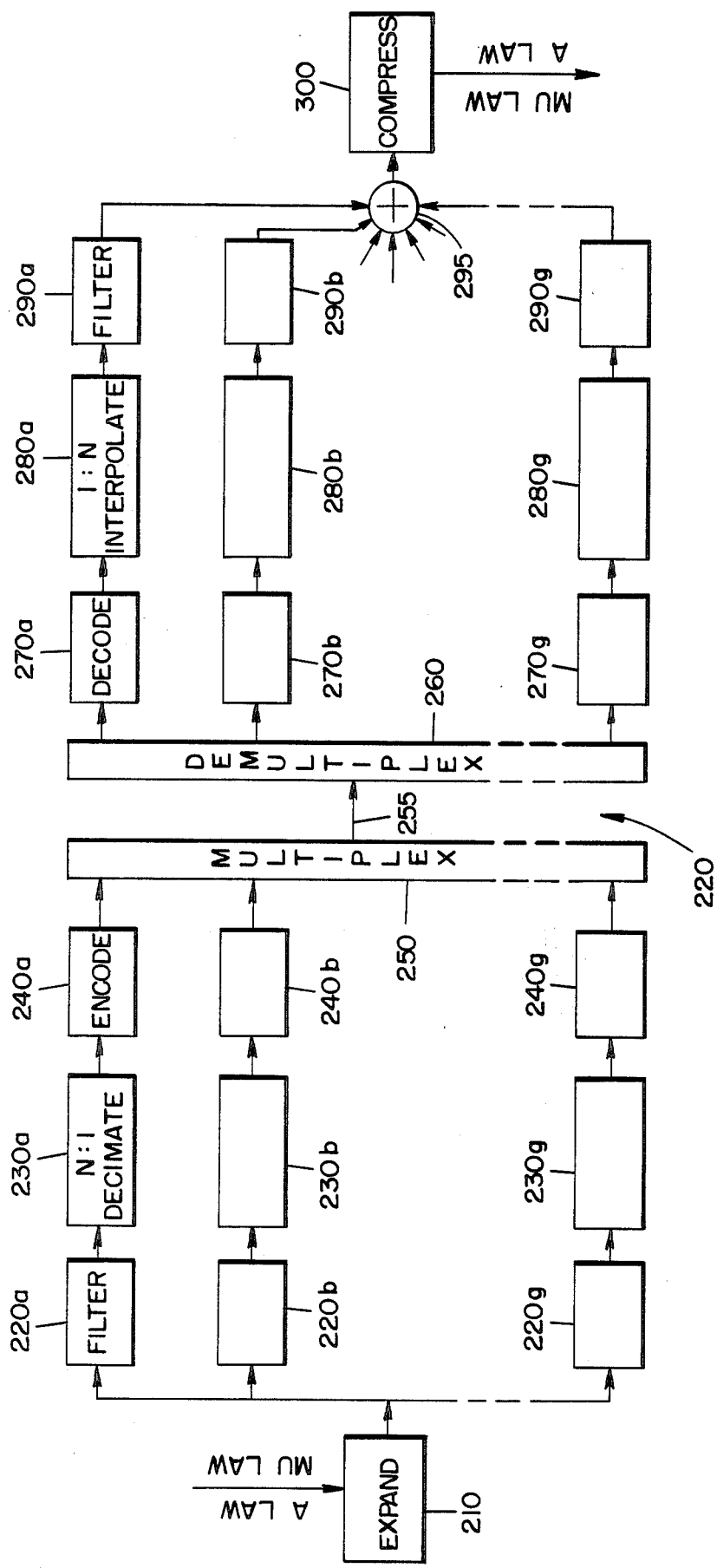
FIG. 2 is a block diagram of a speech coder in which the frame synchronization method of FIG. 1 may be used.

Turning to FIG. 2, a device which makes use of the synchronization methods of FIG. 1 is briefly described for purposes of indicating the advantages of the invention only. A speech coder and decoder 200 includes bit expansion means 210, frequency filters 220a, 220b . . . , decimators 230a, 230b . . . , encoders 240a, 240b . . . , a multiplexer 250, and a demultiplexer 260, decoders 270a, 270b . . . , interpolators 280a, 280b . . . , reverse filters 290a, 290b . . . , and compression means 300.

More particularly, voice information which has been compressed into eight-bit coded samples according to A or Mu Law PCM is expanded at bit expansion means 210 into a fourteen-bit linear pulse code modulated signal. The linear PCM signals are then split into seven adjacent frequency groups of approximately 500 Hz by using filters 220a, 220b . . . Segments of the signals (on the order of eight or more milliseconds) are then used to provide information which is decimated and encoded. Thus, at 230a, 230b . . . , data samples of the segments are chosen and normalized with the root mean square (RMS) value of the signal segment of that frequency group. Because all of the chosen samples cannot be sent by multiplexer 250, the chosen bits are then subject to a list allocation sheme known in the art which decides how the bits should be allocated amongst the frequency groups. Once all of the bits are allocated, the data samples from each frequency group are quantised in encoder 240. A one, two, three, four, or five bit quantiser is used depending upon the number of bits allocated to the particular frequency group according to the chosen allocation scheme. The quantised samples are then sent over an aggregate 255 according to the frame format of the multiplexer 250.

In order to provide enough information from which a signal which corresponds closely with an original signal can be reconstructed, the information multiplexed by multiplexer 250 should include both the quantised samples and the RMS values for each frequency group. Additionally, it would be greatly advantageous to include a checksum for the RMS values. Thus, one frame format for the speech coder outlined above (with seven frequency groups) has a four bit logarithmic quantization of the RMS values of each frequency group sent in group numeric order, followed by a four bit checksum of the RMS values, followed by ninety-six data bits of the quantised data samples in an order according to the chosen bit allocation scheme. In all, the frame consists of one hundred twenty-eight bits. The information so multiplexed is received by the demultiplexer 260 which establishes synchronization according to the scheme described above. Thus, the RMS values which are sent in bit positions one through twenty-eight, and the checksum of the RMS values which is sent bit positions twenty-nine through thirty-two are used to establish synchronization. Using the RMS values as sent, the decoders 270a, 270b, . . . and interpolators 280a, 280b . . . , are able determine which quantised bits correspond to which frequency group, and assign values for the samples. Then, using filters 290a, 290b . . . , the values for the samples are used to reconstruct at 295 the fourteen bit linear PCM signal which approximates that originally seen at the output of expansion means 210. The compression means 300 is then be used to take the linear PCM signal and provide an A Law or Mu Law PCM signal as required.

Those skilled in the art will appreciate that the coder described with reference to FIG. 2 requires the transfer of RMS data and the checksum of that data, and can therefore make use of the synchronization scheme of the invention. Thus, a checksum can be used in a dual role as an error check of certain bits as well as a synchronization word rather than requiring synchronization bits to be included in the frame format of the multiplexer. Those skilled in the art will also recognize that if the synchronization technique of the invention is used in conjunction with a coder similar to that of FIG. 2, false determinations of synchronization may be avoided as the synchronization word (the checksum) will typically change over time because of a change in the RMS values of the signal segments. Thus, even where a channel is continuously transmitting tones at particular amplitudes and frequencies, data bits should not coincidentially correspond with the "sync word" as the "sync word" for the provided invention will be changing.

There has been described and illustrated herein methods in accordance with the present invention for obtaining synchronization between multiplexers by utilizing previously allocated bits of the frame, such as the checksum of other bits in the frame, in a second capacity as synchronization bits. While particular embodiments of the invention have been described, it is not intended that the invention be limited exactly thereto, as it is intended that the invention be as broad in scope as the art will permit. Thus, while a speech coder was described as using the invention by using a checksum of RMS values of speech segments, the invention may be implemented in other devices. For example, in non-instantaneous companding techniques, a scaling factor and a checksum therefor are often transmitted with other data. Clearly, the method invention could be used to establish synchronization by making use of the scaling factor checksum. Those skilled in the art will also recognize that while a checksum calculated through the use of exclusive OR logic was provided herein, other equations which provide a checksum may be used without deviating from the teachings of the invention. Likewise, while in one preferred embodiment the checksum was calculated for data bits comprised of the RMS values of various frequency groups, it should be appreciated that the checksum of any particular predetermined bits may be used. Thus, while a checksum is preferably calculated for "data" in the frame, if desired, even control information or intermultiplexer communication information may be used for establishing synchronization.

Finally, it should be appreciated that while certain parameters such as synchronization determination counter thresholds were assigned particular values, such determinations can be made with other values as desired. Moreover, it should be understood that the terminology used herein for various concepts should be construed broadly. For example, the term "checksum" as defined herein is intended to encompass one or more redundant bits that are used to detect errors introduced during data transmission. Thus, a calculation using particular bits of information as well as a function of that calculation are both "checksums" for purposes herein. Likewise, "bit distances", "bit locations", and "bit positions" are to be construed broadly to indicate the ability to assign an order to information being sent and received according to a frame format where once a starting point is defined, information may be accessed due to its assigned order. Therefore, it will be apparent to those skilled in art that other changes and modifications may be made to the invention as described in the specification without departing from the spirit and scope of the invention as so claimed.

I claim:

1. A method for providing synchronization between first and second communicating multiplexers, wherein said first multiplexer having a frame format multiplexes at least data according to the frame format and sends the data over an aggregate channel to said second multiplexer, and wherein said second multiplexer demultiplexes according to said frame format at least data received from said aggregate channel, the method comprising:
   (a) providing said frame format with bit positions for a plurality of bits including first predetermined bit positions for a plurality of checksum bits, and second predetermined bit positions for bits other than checksum bits;
   (b) calculating a checksum for the bit values of bits located at said second predetermined bit positions, and inserting bits representing the said calculated checksum into said first predetermined bit positions;
   (c) sending bits including bits located at said first and second predetermined bit positions in said frame format from said first multiplexer to said second multiplexer; and
   (d) establishing synchronization between said first and second communicating multiplexers by using said bits representing said calculated checksum.

2. A method according to claim 1, further comprising:
   (e) maintaining synchronization between said first and second multiplexers by using said bits representing said calculated checksum.

3. A method according to claim 1, wherein said synchronization between said multiplexers is established at step (d) by:
   at said second multiplexer
   (1) choosing a bit of information received from said first multiplexer and defining the chosen bit as the first bit of a frame,
   (2) locating bits which are at bit distances away from said bit chosen at step (1), said bit distances being equivalent to said second predetermined bit positions,
   (3) calculating a checksum of said bits located according to step (2);
   (4) locating bits which are at bit distances away from said bit chosen at step (1), said bit distances being equivalent to said first predetermined positions,
   (5) comparing said bits located by steps (3) and (4), and
   (6) if said compared bits are unequal, choosing another bit of information as the first bit of said frame and repeating steps (2) through (5) until said compared bits are equal.

4. A method according to claim 3, wherein:
   said another bit of information chosen when said compared bits are not equal is the next bit sequentially received by said demultiplexing multiplexer.

5. A method according to claim 3, wherein synchronization between said multiplexers is established according to step (d) further by:
   (7) if said compared bits at step (5) are equal, maintaining said position of said chosen bit of information as the position of the first bit of the next frame of information,
   (8) repeating steps (2) through (5) for a plurality of frames of information, and (9) if said bits are unequal for any of said plurality of frames, repeating steps (2) through (8) until said bits are equal for a plurality of frames.

6. A method according to claim 4, wherein synchronization between said multiplexers is established according to step (d) further by:
(7) if said compared bits at step (5) are equal, maintaining the position of said chosen bit of information as the position of the first bit of the next frame of information,
(8) repeating steps (2) through (5) for a plurality of frames of information, and
(9) if said bits are unequal for any of said plurality of frames, repeating steps (2) through (8) until said bits are equal for a plurality of frames.

7. A method according to claim 3, further comprising:
(e) maintaining synchronization between said communicating multiplexers by using said bits representing said calculated checksum, wherein synchronization is maintained by,
maintaining the position of said chosen bit of information as the position of the first bit of the frame when said compared bits at step (5) are equal,
for each new frame of information being received by said second multiplexer, calculating a new checksum for bits located according to step (2), and comparing the new checksum with bits located according to step (4),
causing an up-down counter having a count to count down if said new calculated checksum bits and said checksum bits located according to step (4) are unequal,
comparing the count of the up-down counter to a predetermined threshold, and
repeating steps (1) through (6) to reestablish synchronization if said count reaches said predetermined threshold.

8. A method according to claim 6, further comprising:
(e) maintaining synchronization between said communicating multiplexers by using said bits representing said calculated checksum, wherein synchronization is maintained by,
maintaining the position of said chosen bit of information as the position of the first bit of said frame format when said compared bits are equal for a plurality of frames according to step (9),
for each new frame of information being received by said second multiplexer after synchronization is determined according to steps (1) through (9), calculating a new checksum for the bits located according to step (2) and comparing the new checksum with bits located according to step (4),
causing an up-down counter having a count to count down if said new bits occupying the checksum bit position and said new checksum are unequal,
causing said up-down counter to count up if said new bits occupying the checksum bit position and said new checksum are equal and said up-down counter is at a count other than a maximum value threshold,
comparing the count of the up-down counter to a predetermined lower threshold, and
repeating steps (1) through (9) to reestablish synchronization if said count reaches said predetermined lower threshold.

9. A method according to claim 2, wherein:
said checksum calculated at step (b) for the bit values of bits located at second predetermined positions in said frame format is calculated by successive exclusive OR operations of the bit values.

10. A method according to claim 2, wherein:
said checksum calculated at step (b) for the bit values of bits located at second predetermined locations in said frame format is calculated by an exclusive OR operation between a function other than an identity function and the result of successive exclusive OR operations of the bit values.

11. A method according to claim 9, wherein:
said bit values of bits located at said second predetermined locations in said frame format represent root mean square information for a plurality of voice frequency groupings.

12. A method according to claim 10, wherein:
said bit values of bits located at second predetermined locations in said frame format represent root mean square information for a plurality of voice frequency groupings.

13. A method according to claim 6, wherein:
said checksum calculated at step (b) for the bit values of bits located at second predetermined positions in said frame format is calculated by successive exclusive OR operations of the bit values.

14. A method according to claim 6, wherein:
said checksum calculated at step (b) for the bit values of bits located at second predetermined locations in said frame format is calculated by an exclusive OR operation between a function other than an identity function and the result of successive exclusive OR operations of the bit values.

15. A method according to claim 13, wherein:
said bit values of bits located at said second predetermined locations in said frame format represent root mean square information for a plurality of voice frequency groupings.

16. A method according to claim 14, wherein:
said bit values of bits located at second predetermined locations in said frame format represent root mean square information for a plurality of voice frequency groupings.

17. A method according to claim 8, wherein:
said checksum calculated at step (b) for the bit values of bits located at second predetermined positions in said frame format is calculated by successive exclusive OR operations of the bit values.

18. A method according to claim 8, wherein:
said checksum calculated at step (b) for the bit values of bits located at second predetermined locations in said frame format is calculated by an exclusive OR operation between a function other than an identity function and the result of successive exclusive OR operations of the bit values.

19. A method according to claim 17, wherein:
said bit values of bits located at second predetermined locations in said frame format represent root mean square information for a plurality of voice frequency groupings.

20. A method according to claim 18, wherein:
said bit values of bits located at second predetermined locations in said frame format represent root mean square information for a plurality of voice frequency groupings.

* * * * *